United States Patent
Chidambaram Nachiappan et al.

(10) Patent No.: US 10,972,408 B1
(45) Date of Patent: Apr. 6, 2021

(54) CONFIGURABLE PACKET ARBITRATION WITH MINIMUM PROGRESS GUARANTEES

(71) Applicant: Apple Inc., Cupertino, CA (US)

(72) Inventors: Nachiappan Chidambaram Nachiappan, Santa Clara, CA (US); Vinodh R. Cuppu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/786,581

(22) Filed: Feb. 10, 2020

(51) Int. Cl.
*G06F 13/364* (2006.01)
*H04L 12/937* (2013.01)
*H04L 12/863* (2013.01)
*G06F 13/362* (2006.01)
*G06F 13/374* (2006.01)

(52) U.S. Cl.
CPC .......... *H04L 49/254* (2013.01); *G06F 13/364* (2013.01); *G06F 13/3625* (2013.01); *G06F 13/374* (2013.01); *H04L 47/6225* (2013.01)

(58) Field of Classification Search
CPC .. G06F 13/3625; G06F 13/364; G06F 13/374; H04L 49/254; H04L 47/6225
See application file for complete search history.

(56) References Cited

U.S. PATENT DOCUMENTS

| | | | |
|---|---|---|---|
| 5,905,998 A | 5/1999 | Ebrahim et al. | |
| 6,026,461 A | 2/2000 | Baxter et al. | |
| 6,516,379 B1 | 2/2003 | Deshpande et al. | |
| 6,523,076 B1 | 2/2003 | Kruse | |
| 6,542,949 B1 | 4/2003 | Kruse | |
| 7,079,485 B1 * | 7/2006 | Lau | H04L 49/3045 370/229 |
| 7,149,829 B2 * | 12/2006 | Weber | G06F 9/526 710/243 |

(Continued)

OTHER PUBLICATIONS

Shreedhar et al., "Efficient Fair Queueing Using Deficit Round Robin", IEEE/ACM Transactions on Networking, Jun. 1996, pp. 375-385, vol. 4, No. 3, IEEE Press.

(Continued)

*Primary Examiner* — Henry Tsai
*Assistant Examiner* — John B Roche
(74) *Attorney, Agent, or Firm* — Kowert Hood Munyon Rankin and Goetzel PC; Rory D. Rankin

(57) ABSTRACT

Systems, apparatuses, and methods for implementing a configurable packet arbiter with minimum progress guarantees are described. An arbiter includes at least control logic, a plurality of counters, and a tunables matrix. The tunables matrix stores values for a plurality of configurable parameters for the various transaction sources of the arbiter. These parameter values determine the settings that the arbiter uses for performing arbitration. One of the parameters is a minimum progress guarantee value that specifies how many times each source should be picked per interval. The minimum progress guarantee helps to reduce arbitration-related jitter. Also, the arbiter includes a grant counter for each source. After the minimum progress guarantees are satisfied, the arbiter selects the source with the lowest grant counter among the sources with packets eligible for arbitration. Then, the arbiter increments the grant counter of the winning source by a grant increment amount specific to the source.

20 Claims, 7 Drawing Sheets

(56) References Cited

U.S. PATENT DOCUMENTS

| | | | | |
|---|---|---|---|---|
| 7,430,650 | B1* | 9/2008 | Ross | G06F 12/0862 |
| | | | | 711/137 |
| 7,461,190 | B2 | 12/2008 | Subramanian et al. | |
| 8,037,250 | B1* | 10/2011 | Barreh | G06F 12/0842 |
| | | | | 711/125 |
| 8,682,864 | B1* | 3/2014 | Plevyak | G06F 16/2379 |
| | | | | 707/688 |
| 2001/0010066 | A1* | 7/2001 | Chin | G06F 13/1605 |
| | | | | 711/108 |
| 2017/0286300 | A1 | 10/2017 | Doshi et al. | |

OTHER PUBLICATIONS

Tong, et al., U.S. Appl. No. 15/939,099, entitled "Method to Ensure Forward Progress of a Processor in the Presence of Persistent External Cache/TLB Maintenance Requests", filed Mar. 28, 2018, 48 pages.

Non-Final Office Action in U.S. Appl. No. 15/939,099, dated Mar. 18, 2020, 8 pages.

* cited by examiner

| Tunable Per Leg | Leg 1 | Leg 2 | Leg 3 | Leg 4 | Leg 5 | Leg 6 | ... |
|---|---|---|---|---|---|---|---|
| Read Request Size – Impact on Grant Counter | Enable | Enable | Enable | Enable | Enable | Enable | ... |
| Write Request Size – Impact on Grant Counter | Enable | Enable | Enable | Enable | Enable | Enable | ... |
| Rate Limiter – Impact on Grant Counter | Enable | Disable | Enable | Enable | Enable | Disable | ... |
| Transaction Limit – Impact on Grant Counter | Disable | Disable | Disable | Disable | Disable | Enable | ... |
| Credit Availability – Impact on Grant Counter | Enable | Enable | Enable | Enable | Enable | Enable | ... |
| Memory Fetch Granule (MFG) Interleave | Enable | Disable | Disable | Disable | Disable | Disable | ... |
| MFG Ineligible – Impact on Grant Counter | Disable | 5 | 2 | 2 | 1 | 1 | ... |
| Minimum Progress | 5 | 2 | 2 | 2 | 2 | 2 | ... |
| Decay Factor | 2 | 1 | 10 | 10 | 100 | 100 | ... |
| Grant Increment (Inverse of Weight) | 1 | 1 | 10 | 10 | 100 | 100 | ... |
| Grant Decrement | 1 | ... | ... | ... | ... | ... | ... |
| ... | | | | | | | |

CONFIGURABLE PACKET ARBITRATION WITH MINIMUM PROGRESS GUARANTEES

BACKGROUND

Technical Field

Embodiments described herein relate to the field of computing systems and, more particularly, to efficiently arbitrating requests during transport.

Description of the Related Art

Digital systems of various types generally include a variety of components connected together via a communication fabric. The communication fabric can include buses, point-to-point links, hierarchical interconnects, full or partial crossbars, etc. At various points within the fabric, transactions from different sources can share part of the fabric. Generally, an arbiter is employed to select among the transactions when there is a conflict. For example, a conflict can occur when transactions arrive at the shared point contemporaneously. A conflict can occur when sources connected to a shared point (e.g., a shared bus) concurrently have transactions to initiate. Various arbitration schemes exist to perform the transaction selection, typically attempting to be fair over time to each source, to prevent starvation of each source, and to provide high performance and high utilization of the bandwidth on the fabric. It is noted that the term "transaction" may also be used interchangeably herein with "request" and "packet".

One type of arbitration scheme is a "round robin" scheme. In the round robin scheme, the sources are logically ordered in a ring. The order of sources in the ring is referred to as the round robin order, and does not necessarily correlate to the physical locations of the sources. The arbiter maintains a pointer to one of the sources, and that source is the highest priority source for transactions for the current arbitration. The arbiter can select a transaction from the source that is identified as highest priority, and can advance the pointer to the next source in the round robin order. The pure round robin scheme provides equal opportunity to each source over time, but may not always match up to when the source has a transaction to send. Additionally, providing equal opportunity to all sources may not be the best overall scheme for performance. For example, the sources can have different bandwidth requirements, and thus better overall performance can be achieved by providing more bandwidth to some sources than others.

SUMMARY

Systems, apparatuses, and methods for implementing a configurable packet arbiter with minimum progress guarantees are contemplated. In various embodiments, a communication fabric includes a plurality of arbiters managing the flow of packets through the fabric. In one embodiment, each arbiter includes at least control logic, a plurality of counters, and a tunables matrix. The tunables matrix stores values for a plurality of configurable parameters for the various transaction sources of the arbiter. These parameter values determine the settings that the arbiter uses for performing arbitration. In one embodiment, one of the parameters is a minimum progress guarantee value that specifies how many times each source should be picked per interval. The minimum progress guarantee helps to reduce arbitration-related jitter. Also, the arbiter includes a grant counter for each source. After the minimum progress guarantees are satisfied, the arbiter selects the source with the lowest grant counter among the sources with packets eligible for arbitration. Then, the arbiter increments the grant counter of the winning source by a grant increment amount specific to the source.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which:

FIG. 3 illustrates a diagram of one embodiment of a tunables matrix.

Figure 1:
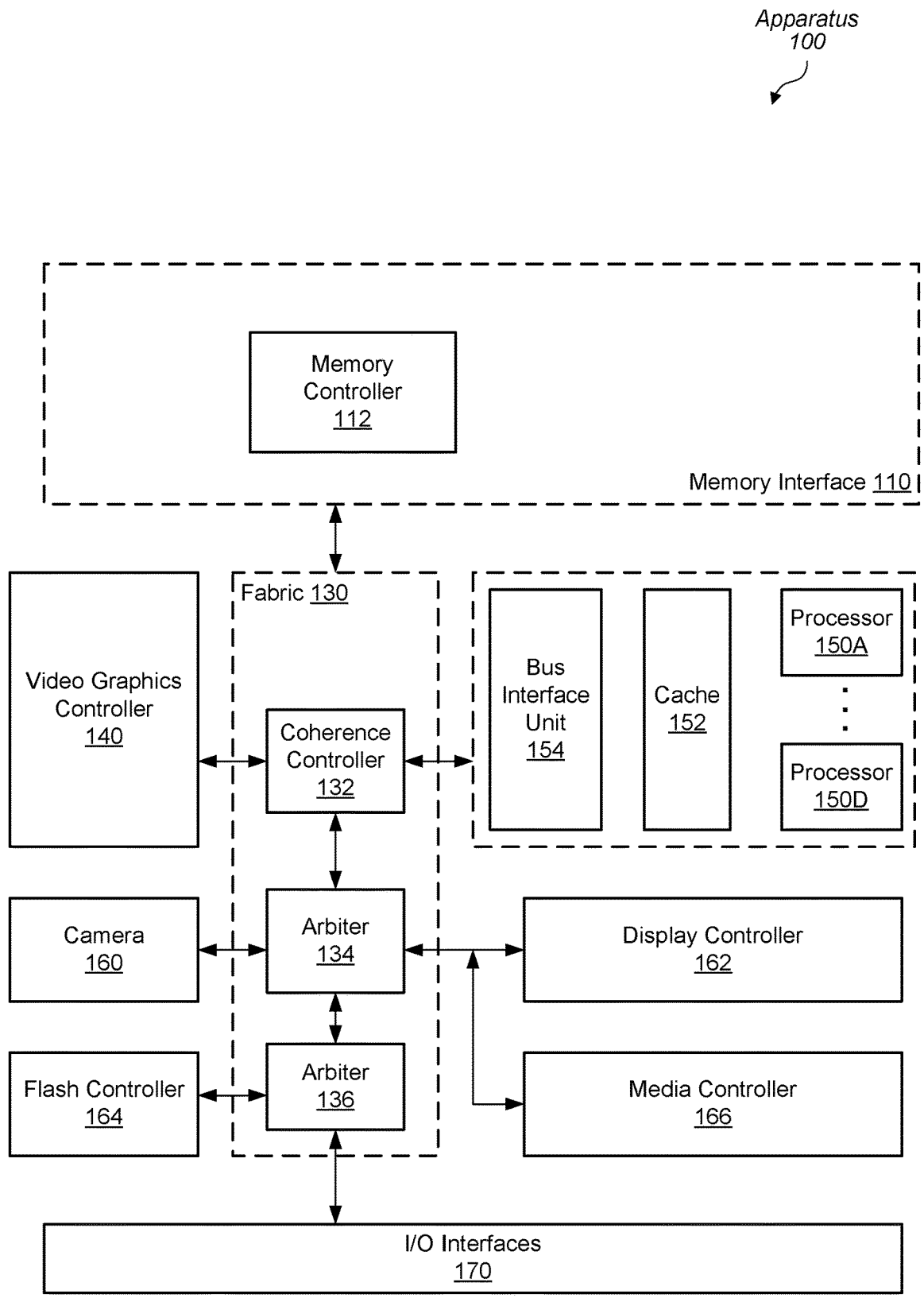
FIG. 1 is a generalized block diagram of one embodiment of an apparatus.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram illustrating one embodiment of an apparatus 100 is shown. The apparatus 100 includes multiple functional blocks or units. In some embodiments, the multiple functional units are individual dies on an integrated circuit (IC), such as a system-on-a-chip (SoC). In other embodiments, the multiple functional units are individual dies within a package, such as a multi-chip module (MCM). In yet other embodiments, the multiple functional units are individual dies or chips on a printed circuit board. The multiple functional blocks or units may each be capable of accessing a shared memory.

In various embodiments, the apparatus 100 is a SoC that includes multiple types of IC designs on a single semiconductor die, wherein each IC design provides a separate functionality. The IC designs on the apparatus 100 may also be referred to as functional blocks. Traditionally, each one of the types of IC designs, or functional blocks, has been manufactured on a separate silicon wafer. In the illustrated embodiment, the apparatus 100 includes multiple IC designs; a fabric 130 for high-level interconnects and chip communication, a memory interface 110, and various input/output (I/O) interfaces 170. Clock sources, such as phase lock loops (PLLs), and a centralized control block for at least power management are not shown for ease of illustration.

The multiple IC designs within the apparatus 100 include various analog, digital, mixed-signal and radio-frequency (RF) blocks. In the illustrated embodiment, the apparatus 100 includes one or more processors 150A-150D with a supporting cache hierarchy that includes at least cache 152. In some embodiments, the cache 152 is a shared level two (L2) cache for the processors 150A-150D. In addition, the multiple IC designs include a display controller 162, a flash memory controller 164, and a media controller 166. Further, the multiple IC designs may include a video graphics controller 140 and one or more processing blocks associated with real-time memory performance for display and camera subsystems, such as camera 160. In other embodiments, the apparatus 100 includes other types of processing blocks in addition to or in place of the blocks shown. These processing blocks may also be referred to more generally as agents or endpoints.

In various embodiments, the fabric 130 provides a top-level interconnect for the apparatus 100. For example, connections to the cache coherence controller 132 exist for various requestors within the apparatus 100. A requestor is one of the multiple IC designs on the apparatus 100. The cache coherence controller 132 provides to the multiple IC designs a consistent data value for a given data block in the shared memory, such as off-chip dynamic random access memory (DRAM). The coherence controller 132 may use a cache coherency protocol for memory accesses to and from the memory interface 110 and one or more caches in the multiple IC designs on the apparatus 100.

The memory interface 110 uses the memory controller 112 which is not a coherency point within the apparatus 100 as it is separate from the coherence controller 132. The interface between the combination of the memory interface 110 and the coherency controller 132 and the remainder of the apparatus 100, which includes the multiple IC designs and the arbiters 134 and 136, includes multiple buses. Asynchronous memory requests, responses, snoops, snoop responses, and input/output (I/O) transactions are visible at this interface with temporal relationships.

The display controller 162 sends rendered graphics output information to one or more display devices. The rendering of the information is performed by the display controller 162, by the video graphics controller 140, or by one of the processors 150A-150D which is a GPU. Alternatively, the display controller 162 may send graphics output information to the video graphics controller 140 to be output to one or more display devices. The graphics output information corresponds to frame buffers accessed via a memory mapping to the memory space of a GPU within the video graphics controller 140 or within one of the processors 150A-150D.

Each one of the processors 150A-150D uses one or more cores and one or more levels of a cache memory subsystem. Each core supports the out-of-order execution of one or more threads of a software process and includes a multi-stage pipeline. In one embodiment, one or more of the processors 150A-150D uses circuitry for executing instructions according to a predefined general-purpose instruction set. For example, the PowerPC® instruction set architecture (ISA) may be selected. Alternatively, the ARM®, x86®, x86-64®, Alpha®, MIPS®, PA-RISC®, SPARC® or any other instruction set architecture is selected.

Other processor cores of processors 150A-150D have a micro-architecture which provides high instruction throughput for a computationally intensive task such as a single instruction multiple data (SIMD) core. Examples of SIMD cores include graphics processing units (GPUs) and digital signal processing (DSP) cores. One or more of the processors 150A-150D uses multiple on-die levels (L1, L2, L3 and so forth) of caches for accessing data and instructions. If a requested block is not found in the on-die caches or in the off-die cache 152, then a read request for the missing block is generated and transmitted to the memory interface 110 or to on-die flash memory (not shown) controlled by the flash controller 164. The bus interface unit (BIU) 154 provides memory access requests and responses for at least the processors 150A-150D.

The processors 150A-150D share the on-chip flash memory and the off-chip DRAM accessed through the memory interface 110 with other processing blocks, such as graphics processing units (GPUs), application specific integrated circuits (ASICs), and other types of processor cores. Therefore, SoC designs often utilize acceleration engines, or accelerators, to efficiently coordinate memory accesses and support coherency transactions between processing blocks and peripherals. In a SOC design that includes multiple processors and processing blocks, these components communicate with each other to control access to shared resources.

Figure 2:
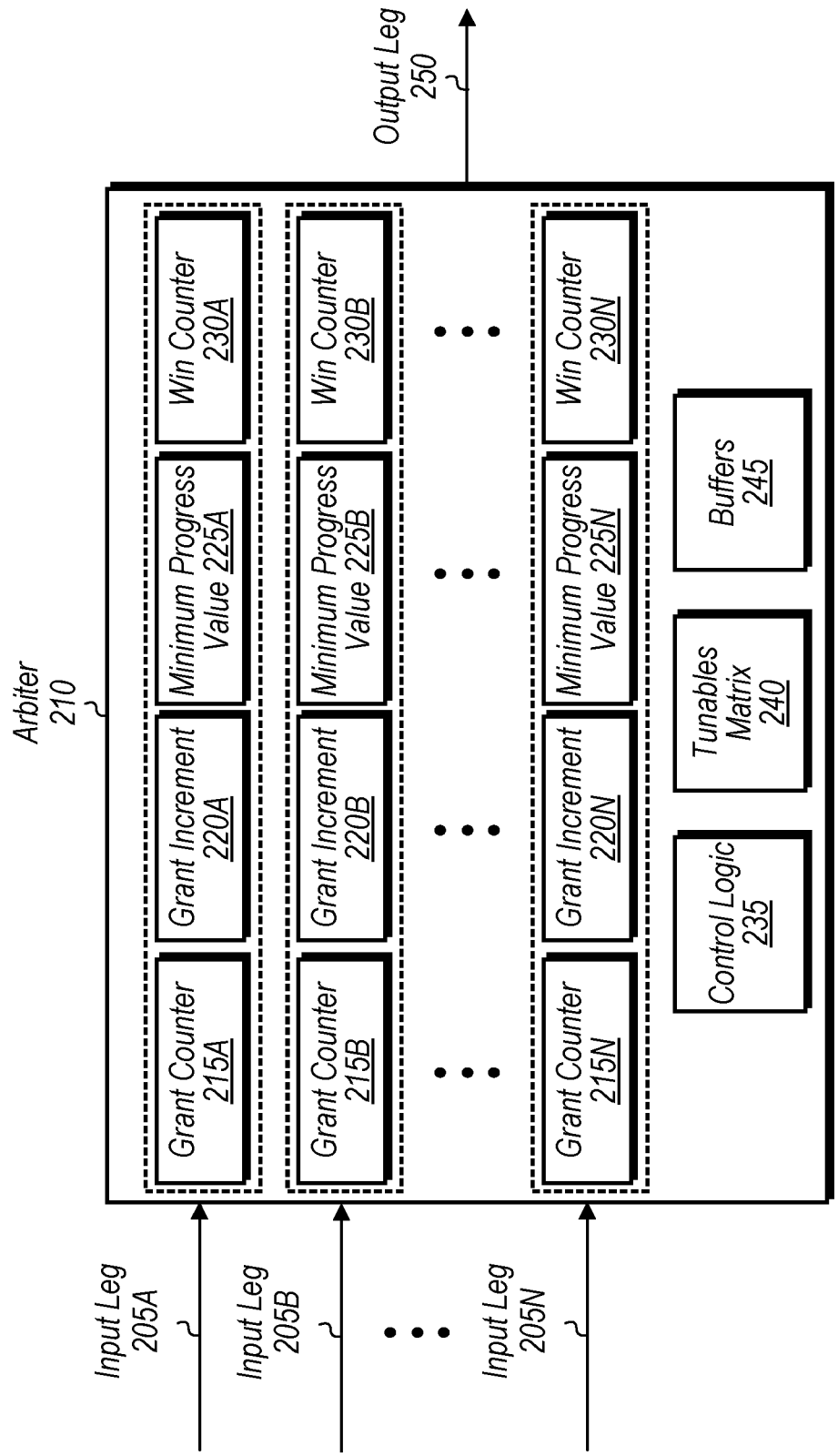
FIG. 2 is a generalized block diagram illustrating one embodiment of an arbiter.

Turning now to FIG. 2, a block diagram of one embodiment of an arbiter 210 is shown. As shown in FIG. 2, arbiter 210 is connected to input legs 205A-N and output leg 250. Input legs 205A-N are representative of any number and type of input legs, with each input leg representing a separate path, connection, transaction source, input port, agent, functional unit, stream, or flow. The flows may correspond to virtual channels, subchannels, traffic types, traffic classes, or the like. In one embodiment, for each input leg 205A-N, arbiter 210 includes a corresponding grant counter 215A-N, grant increment 220A-N, minimum progress value 225A-N, and win counter 230A-N. It is noted that a "minimum progress value" may also be referred to as a "minimum performance guarantee value", "minimum progress guarantee", or "minimum guarantee tunable value". Arbiter 210 also includes control logic 235, tunables matrix 240, and buffers 245 for storing packets and corresponding payload data during transport. It is noted that arbiter 210 may also be referred to as an "arbitration circuit".

In some embodiments, control logic 235 includes a combination of combinatorial logic and sequential elements for storing traffic in buffers 245, selecting traffic to send on output leg 250, such as using arbitration logic, and sending the selected traffic on output leg 250. While only a single output leg 250 is shown in FIG. 2, it is noted that this is shown merely for ease of illustration. It should be understood that arbiter 210 can have any number of output legs, with the number varying from 1 to N, wherein N is a positive integer. In some embodiments, the functionality of control logic 235 is implemented in hardware such as circuitry. In other embodiments, the functionality of control logic 235 is implemented as a combination of hardware and software.

In one embodiment, each grant counter 215A-N tracks how often the corresponding leg has been selected as the winner by arbiter 210 in increments specified by the corresponding grant increment 220A-N. For example, if the grant increment 220A for input leg 205A is 1, then the value of grant counter 215A represents the number of times input leg 205A has been picked as the winner of arbitration for the current interval. In another example, if the grant increment 220B for input leg 205B is 10, then the value of grant counter 215B represents ten multiplied by the number of times input leg 205B has been picked as the winner of arbitration for the current interval. In one embodiment, the values of grant increments 220A-N are the inverse of the weights applied to each input leg 205A-N. In one embodiment, an interval is measured in terms of units of time. In another embodiment, an interval is measured by a number of clock cycles. In a further embodiment, the duration of an interval is determined by a number of packets processed by the arbiter. In a still further embodiment, an interval is the lesser of some amount of time or a specified number of packets being processed. In other embodiments, other ways of measuring the duration of an interval are possible and are contemplated.

For example, in one embodiment, there are three input legs 205A-N for real-time (RT), low latency (LLT), and large non-time sensitive (i.e., bulk) traffic, and the weight for real-time is 100, the weight for LLT is 20, and the weight for bulk is 1. It is noted that these example weights are merely representative of one particular embodiment. Other embodiments may have other weights assigned to the different input legs 205A-N. For this example, the grant increments 220A-N are the inverse of the weights. Accordingly, grant increments 220A-N are 1/1, 1/20, and 1/100 for bulk, LLT, and RT, respectively. In one embodiment, the grant increments are converted into whole numbers by multiplying by the largest factor that divides all denominators. The largest factor in this case is 100. This results in grant increments 220A-N being 100 for bulk, 5 for LLT, and 1 for RT. Whenever a bulk packet is granted, its grant counter 215A is incremented by its grant increment 220A value of 100. Whenever a LLT packet is granted, its grant counter 215B is incremented by its grant increment 220B value of 5. Also, whenever a RT packet is granted, its grant counter 215N is incremented by its grant increment 220N value of 1. In one embodiment, grant counters 215A-N are unsigned and are not allowed to be negative numbers.

In one embodiment, at start-up, the grant counters 215A-N are initialized to their corresponding grant increment values 220A-N. In this embodiment, arbiter 210 will start choosing winners with higher weights first. In one embodiment, arbiter 210 chooses the input leg 205A-N with the lowest grant counter 215A-N given that the leg has a packet and is eligible for arbitration. As used herein, the term "eligible for arbitration" is defined as a packet being able to be sent on output leg 250 if the packet is selected. However, when minimum progress guarantees are enabled in arbiter 210, then other considerations will affect the selection of the input leg 205A-N other than just selecting the leg with the lowest grant counter 215A-N. These other considerations will be elaborated on in more detail later on in the discussion.

In one embodiment, if minimum progress guarantees are not enabled or if all minimum progress guarantees have already been satisfied for the current interval, then arbiter 210 chooses the input leg 205A-N with the lowest grant counter 215A-N given that the leg has a packet and is eligible for arbitration. In one embodiment, if two or more grant counters 215A-N have the lowest value, arbiter 210 chooses one of the counters based on which leg was least recently granted. In another embodiment, the leg with the highest weight (i.e., lowest grant increment 220) is selected when two or more grant counters 215A-N are equal and the lowest value. In other embodiments, other techniques may be used to select a winner of arbitration when two or more grant counters 215A-N are equal and the lowest value.

When a winner of arbitration is chosen, the corresponding grant counter 215A-N of the winner is incremented by the corresponding grant increment 220A-N while also factoring in the size of the request. For example, a two data-beat request will have twice the impact on the corresponding grant counter 215A-N as a one data-beat request. The above arbitration algorithm for arbiter 210 keeps repeating until one of the grant counters 215A-N becomes saturated (i.e., reaches the saturation value). The saturation value varies according to the embodiment. For example, in one embodiment, the saturation value is equal to the maximum value based on the number of bits for the counter (e.g., 1023 for a 10-bit counter). In another embodiment, if a given grant counter 215 has a grant increment 220 of 100 and the counter is 10-bits wide, then the saturation value is 1000 for the given grant counter 215.

In one embodiment, when the saturation value of any grant counter 215A-N is reached, arbiter 210 tries to balance out the grant counters 215A-N. In this embodiment, arbiter 210 finds the lowest grant counter 215A-N and then the value of this lowest grant counter is subtracted from every grant counter 215A-N. As long as the lowest grant counter is not equal to zero, after the subtraction step, there will be at least one grant counter 215A-N equal to zero and the rest of the counters will be lower than the saturation value. If this step was successful, then arbiter 210 can continue arbitrating. In one embodiment, none of the grant counters 215A-N are allowed to go negative.

In one embodiment, if one of the grant counters 215A-N is equal to zero and another grant counter is at the saturation value, then the grant counter of the leg that hit saturation is reduced by a programmable amount. In one embodiment, only the grant counter for the saturated leg is reduced so that less history is lost. If the counters for all legs were reduced, many legs would eventually be pulled down to a counter value of zero which would cause a loss of history across all legs. Instead, in this embodiment, arbiter 210 chooses to lose history for only the leg that is saturated, since this leg has already been getting picked relatively frequently. The amount that the grant counter of the leg that hit saturation is reduced can be referred to as a "saturating decrement tunable" and is specified as one of the tunable values in tunables matrix 240.

In one embodiment, minimum progress guarantees are enabled for arbiter 210. In this embodiment, enabling minimum progress guarantees helps to reduce jitter across the legs of arbiter 210. Each input leg 205A-N in arbiter 210 has a corresponding minimum progress value 225A-N which specifies the minimum number of times the leg should be picked per interval. If these minimum progress value 225A-N are enabled, then each leg is picked the specified number of times before normal arbitration is implemented. In one embodiment, tunables matrix 240 includes both minimum progress values 225A-N and a tunable value which specifies the duration of an interval. Additionally, in one embodiment, tunables matrix 240 specifies the grant increments 220A-N for input legs 205A-N.

In one embodiment, the minimum progress guarantee value for a given leg can be calculated by arbiter 210 based on a minimum required bandwidth input value. For example, if the bandwidth required is specified as 1 gigabit-per-second (Gbps) for the given leg, then arbiter 210 calculates the minimum progress guarantee value based on the frequency arbiter 210 is running at and based on the duration of the interval. An example formula, in accordance with one embodiment, for calculating the minimum progress guarantee value could resemble the following format: minimum progress guarantee value=minimum required bandwidth*interval duration/frequency.

In one embodiment, the minimum progress guarantee value is the number of times the given leg should be picked in an interval. In this embodiment, each time the given leg wins arbitration, a counter storing the minimum progress guarantee value is decremented. Once this counter hits zero, arbitration is based on a corresponding grant counter 215. In another embodiment, a counter is decremented by a corresponding grant increment 220 value whenever the given leg wins arbitration. Similar to the previous embodiment, once the counter hits zero, arbitration is based on a corresponding grant counter 215. It should be understood that these descriptions of embodiments for implementing minimum progress guarantee values are non-limiting examples. In other embodiments, other techniques for implementing minimum progress guarantee values for the legs of an arbiter are possible and are contemplated.

If a given leg cannot be picked in an interval because it did not have any packets or because of any blocking conditions, then the given leg's slots are forgotten. In one embodiment, the minimum progress guarantees for the given leg that are missed out in this interval are not carried over to the next interval. If a particular leg could not use its minimum progress slots at the beginning of an interval (e.g., due to unavailability of packets), then the particular leg can use the slots anytime during the interval. For example, in one embodiment, arbiter 210 first looks at win counters 230A-N before deciding to arbitrate using the normal arbitration algorithm. Each win counter 230A-N tracks the number of wins during the current interval for a corresponding input leg 205A-N. At the transition between intervals, arbiter 210 resets win counters 230A-N. If there are multiple input legs 205A-N with unfulfilled minimum progress guarantees, arbiter 210 selects the leg with the maximum weight to first satisfy its requirement. Then the next leg with an unfulfilled minimum progress guarantee is satisfied.

Referring now to FIG. 3, a diagram of one embodiment of a tunables matrix 300 is shown. In one embodiment, the fields of tunables matrix 300 are included in tunables matrix 240 of FIG. 2. The number of columns of tunables matrix 300 depends on the number of input legs coupled to the corresponding arbiter. As shown, tunables matrix 300 has 6 columns, although in other embodiments, the matrix may have other numbers of columns. In one embodiment, legs 1-6 include a real-time (RT) posted leg (leg 1), a RT non-posted leg (leg 2), a low latency (LLT) posted leg (leg 3), a LLT non-posted leg (leg 4), a bulk posted leg (leg 5), and a bulk non-posted leg (leg 6). This is merely representative of one possible implementation. Other embodiments may have other types and/or other numbers of legs. It is noted that a posted transaction is a transaction that does not require an acknowledgment of completion. On the other hand, a non-posted transaction is a transaction that requires an acknowledgment of completion.

The number of rows in tunables matrix 300 varies according to the embodiment. In one embodiment, tunables matrix 300 includes a read request size—impact on grant counter row 305 with enable or disable values stored in the columns for the corresponding legs. The enable or disable setting may be indicated by a single bit in one embodiment. For example, a "1" bit indicates the setting should be enabled while a "0" bit indicates the setting should be disabled. Row 305 indicates if the size of the read request will be applied to the increment of the grant counter when a read request wins arbitration for the corresponding leg. For example, a 2 data-beat read request would cause twice the increment to the grant counter as a 1 data-beat read request if row 305 is enabled. Otherwise, all read requests increment the grant counter by the same amount regardless of the size of the read request if row 305 is disabled. In one embodiment, row 310 indicates if the write request size will be reflected in the increment to the grant counter. Row 310 functions in a similar fashion to row 305.

In one embodiment, row 315 indicates if a rate limiter will have an impact on the grant counter for the corresponding leg. In one embodiment, row 320 indicates if a transaction limit will influence the grant counter for the corresponding leg. In one embodiment, row 325 indicates if credit availability will have an impact on the behavior of the grant counter for the corresponding leg. In one embodiment, row 330 indicates if memory fetch granule (MFG) interleaving is supported for the corresponding leg. In one embodiment, row 335 indicates if MFG ineligibility will have an impact on the grant counter for the corresponding leg. For example, MFGs refers to multiple packets that are meant to be sent together. Until all parts of a MFG arrive at the arbiter, the MFG stream is ineligible for arbitration. Then, once the last part of the MFG arrives at the arbiter, the MFG stream is made eligible for arbitration. While the MFG stream is ineligible for arbitration, the corresponding grant counter is not reduced if row 335 is enabled.

In one embodiment, row 340 specifies the minimum progress guarantees for the various input legs of the arbiter. As shown, legs 1 and 2 have a minimum progress guarantee of 5, while legs 3 and 4 have a minimum progress guarantee of 2, and legs 5 and 6 have a minimum progress guarantee of 1. The minimum progress guarantee indicates the minimum number of times each leg will be picked per interval assuming the leg has that many packets that are eligible for arbitration during the interval. In one embodiment, row 345 specifies the decay factor for each input leg, with the grant counter being decremented by the decay factor multiplied by the grant increment once per interval for the corresponding leg. In one embodiment, row 350 specifies the grant increment for each leg, with the grant increment determining how much the grant counter is incremented each time the corresponding leg wins arbitration. In one embodiment, the grant increment for a leg is the inverse of the weight assigned to the leg. In one embodiment, row 355 specifies the grant decrement of how much the grant counter is decremented if the grant counter hits the saturation point. In other embodiments, tunables matrix 300 may include other tunable parameters which are specified on a per-leg basis.

It should be understood that tunables matrix 300 is intended to represent one particular embodiment. In other embodiments, tunables matrices 300 may include other fields and/or tunables matrix 300 may be structured in other suitable manners. Additionally, it should also be understood that the individual values stored in tunables matrix 300 for the various rows of the input legs are merely indicative of one specific embodiment. These values may differ in other embodiments. These values may also be updated during run-time.

Figure 4:
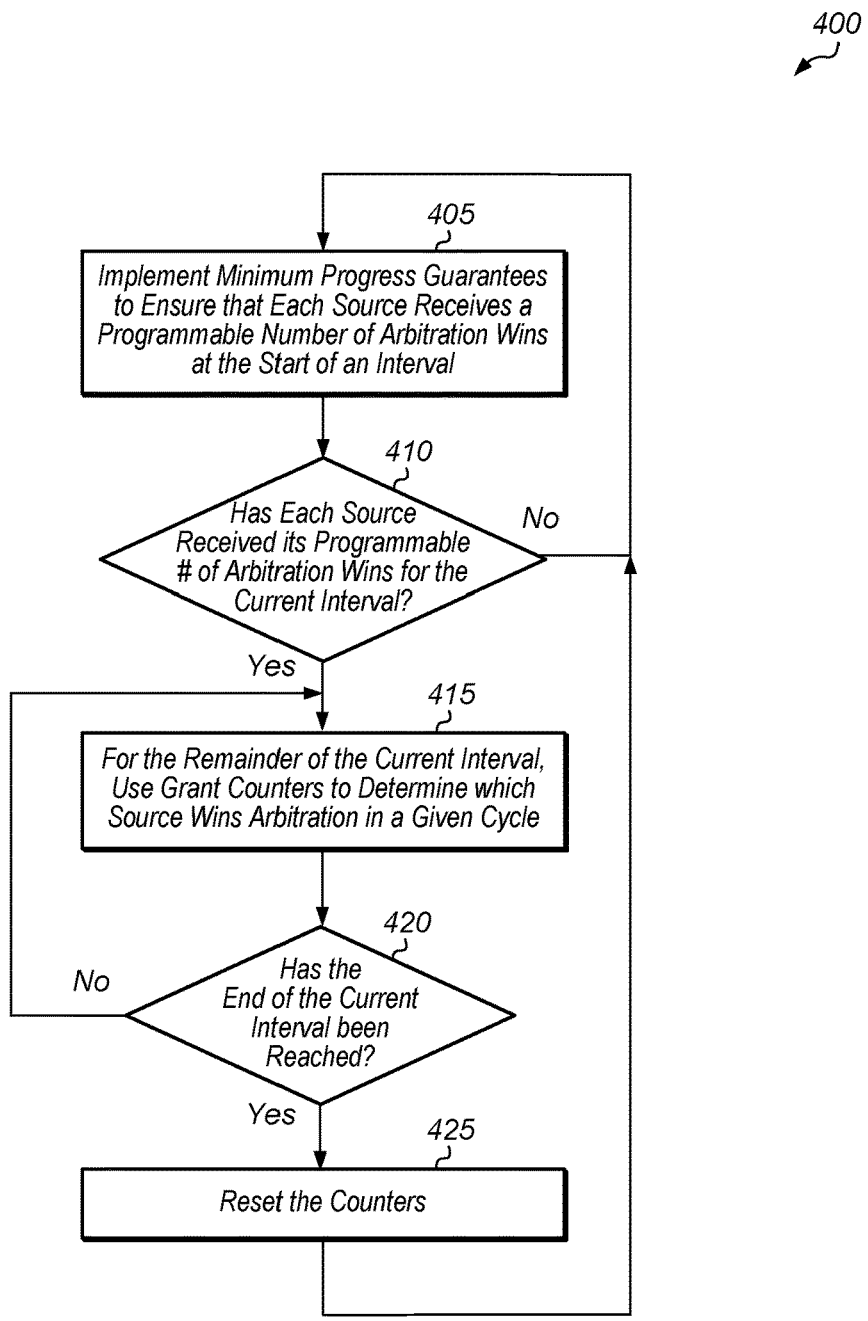
FIG. 4 is a flow diagram of one embodiment of a method for performing configurable packet arbitration with minimum progress guarantees.

Turning now to FIG. 4, a generalized flow diagram of one embodiment of a method 400 for performing configurable packet arbitration with minimum progress guarantees is shown. For purposes of discussion, the steps in this embodiment (as well as for FIGS. 5 and 6) are shown in sequential order. However, in other embodiments some steps may occur in a different order than shown, some steps may be performed concurrently, some steps may be combined with other steps, and some steps may be absent.

An arbiter implements minimum progress guarantees to ensure that each source receives a programmable number of arbitration wins at the start of an interval (block 405). In one embodiment, implementing minimum progress guarantees involves assigning a minimum progress guarantee number to each source, where the minimum progress guarantee number specifies how many arbitration wins a source should receive during each interval of time. Then, the arbiter prioritizes selecting sources which have not reached their minimum progress guarantee number of arbitration wins when packets from multiple sources are concurrently eligible for arbitration. One example of implementing block 405 is described in method 500 of FIG. 5. It is noted that the term "source" can also be used interchangeably herein with "leg", "input leg", "transaction source", "flow", "virtual channel", "agent" or other similar terms.

Once each source has received its programmable number of arbitration wins for the current interval (conditional block 410, "yes" leg), then for the remainder of the interval, the arbiter uses grant counters to determine which source wins arbitration in a given cycle (block 415). For example, in one embodiment, the arbiter selects the source with the lowest grant counter for the current round of arbitration, assuming this source has a packet that is eligible for arbitration. One example of implementing block 415 is described in method 600 of FIG. 6. Next, if the end of the current interval has been reached (conditional block 420, "yes" leg), then the arbiter resets the counters (e.g., win tracking counters) (block 425). In some embodiments, the arbiter decrements the grant counters by a programmable decay value at the end of an interval. Then, method 400 returns to block 405. If the end of the current interval has not been reached (conditional block 420, "no" leg), then method 400 returns to block 415.

Figure 5:
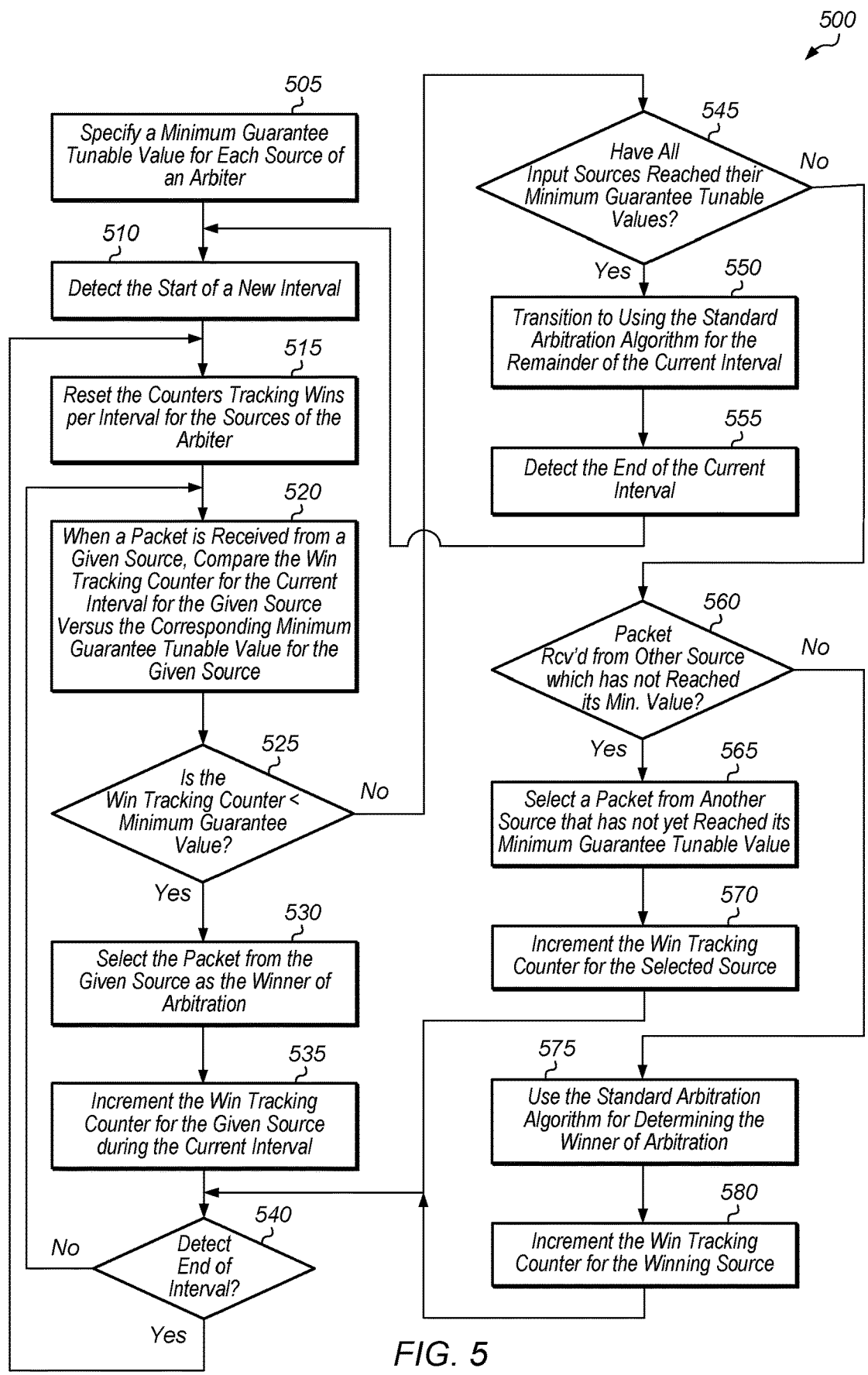
FIG. 5 is a flow diagram of one embodiment of a method for implementing minimum guarantee tunable values for the sources of an arbiter.

Referring now to FIG. 5, one embodiment of a method 500 for implementing minimum guarantee tunable values for the sources of an arbiter is shown. A minimum guarantee tunable value is specified for each source of an arbiter (block 505). In one embodiment, the minimum guarantee tunable values are specified in a tunables matrix (e.g., tunables matrix 300 of FIG. 3). In another embodiment, the arbiter receives a minimum required bandwidth input value for each source and then the arbiter calculates a minimum guarantee tunable value for each source. Next, the start of a new interval is detected by an arbiter (block 510). In one embodiment, an interval is measured in terms of units of time. In another embodiment, an interval is measured by a number of clock cycles. In a further embodiment, the duration of an interval is determined by a number of packets processed by the arbiter. In a still further embodiment, an interval is the lesser of some amount of time or a specified number of packets being processed. In other embodiments, other ways of measuring the duration of an interval are possible and are contemplated.

In response to detecting the start of a new interval, the counters tracking wins per interval for the sources of the arbiter are reset (block 515). Then, when a packet is received on a given source, the arbiter compares the win tracking counter for the current interval for the given source versus the corresponding minimum guarantee tunable value for the given source (block 520). If the win tracking counter for the given source for the current interval is less than the corresponding minimum guarantee tunable value for the given source (conditional block 525, "yes" leg), then the arbiter selects the packet on the given source as the winner of arbitration (block 530). Also, the arbiter increments the win tracking counter for the given source during the current interval (block 535). If multiple packets are received on multiple sources that have not yet reached their minimum guarantee tunable values, then the arbiter may use any of various types of arbitration algorithms to select the winner. For example, in one embodiment, the arbiter selects the source with the greatest weight first to satisfy the minimum guarantee requirement. In other embodiments, other techniques for selecting among multiple sources that have not yet reached their minimum guarantee tunable values may be used. After block 535, if the end of the current interval is detected (conditional block 540, "yes" leg), then method 500 returns to block 515. Otherwise, if the end of the current interval is not detected (conditional block 540, "no" leg), then method 500 returns to block 520.

If the win tracking counter for the given source for the current interval is greater than or equal to the corresponding minimum guarantee tunable value for the given source (conditional block 525, "no" leg), then the arbiter determines if all of the win tracking counters for the sources of the arbiter have reached their minimum guarantee tunable values (conditional block 545). If all of the win tracking counters for the sources of the arbiter have reached their minimum guarantee tunable values (conditional block 545, "yes" leg), then the arbiter transitions to using the standard arbitration algorithm for the remainder of the interval (block 550). After block 550, when the current interval ends (block 555), method 500 returns to block 510.

If not all of the win tracking counters for the sources of the arbiter have reached their minimum guarantee tunable values (conditional block 545, "no" leg), then method 500 determines if a packet eligible for arbitration has been received from another source that has not yet reached its minimum guarantee tunable value (conditional block 560). If a packet eligible for arbitration has been received from another source that has not yet reached its minimum guarantee tunable value (conditional block 560, "yes" leg), then the arbiter selects a packet from another source that has not yet reached its minimum guarantee tunable value (block 565). Then, the arbiter increments the win tracking counter for the selected source (block 570). Otherwise, if there are no packets eligible for arbitration on other sources that have not yet reached their minimum guarantee tunable values (conditional block 560, "no" leg), then the arbiter uses the standard arbitration algorithm for determining the winner of arbitration (block 575). Then, the arbiter increments the win tracking counter for the winning source (block 580). After blocks 570 and 580, method 500 jumps to conditional block 540. It is noted that in one embodiment, if a source cannot be picked in an interval because the source did not have any packets or because of blocking conditions, then the source's slots are forfeit. The minimum progress guarantees for a source missed out in a given interval are not carried over to the next interval.

Figure 6:
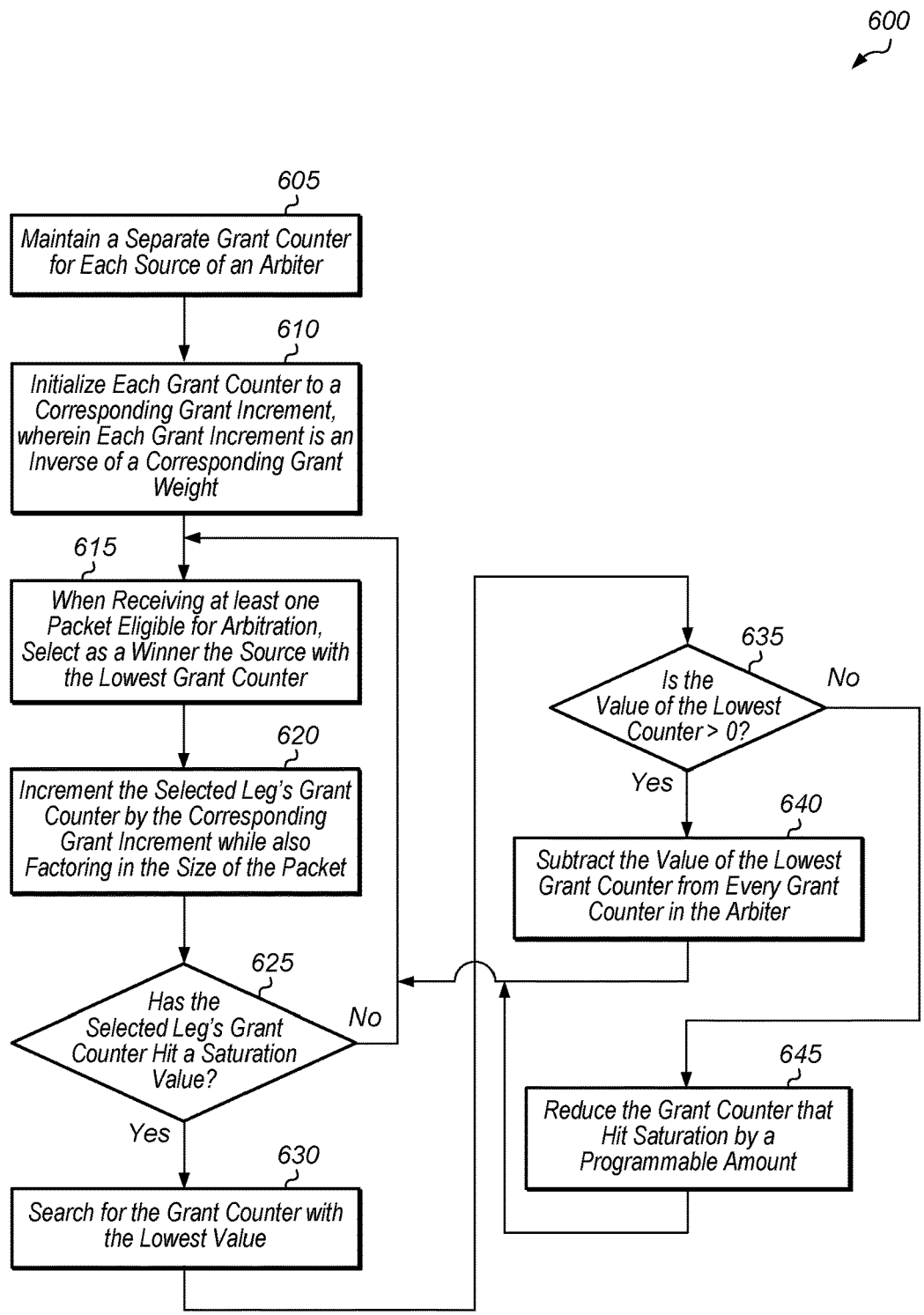
FIG. 6 is a flow diagram of one embodiment of a method for performing arbitration based on grant counters.

Turning now to FIG. 6, one embodiment of a method 600 for performing arbitration based on grant counters is shown. An arbiter maintains a separate grant counter for each source (block 605). At the start of an interval, the arbiter initializes each grant counter of each source to a corresponding grant increment, wherein each grant increment is an inverse of a corresponding grant weight (block 610). When receiving at least one packet eligible for arbitration, the arbiter selects as a winner the source with the lowest grant counter (block 615). As used herein, the term "eligible for arbitration" is defined as a packet being able to be sent on the output port if selected as the winner for this round. In one embodiment, if the lowest two or more grant counters are equal, then the source that was least recently granted is selected. In another embodiment, if the lowest two grant counters are equal, then the grant counter with the lowest grant increment is selected. In other embodiments, other techniques for selecting between two or more sources with the lowest value grant counter may be used. After selecting the source with the lowest grant counter for forwarding a packet, the selected source's grant counter is incremented by the corresponding grant increment while also factoring in the size of the packet (block 620).

If the selected source's grant counter has hit a saturation value (conditional block 625, "yes" leg), then the arbiter searches for the grant counter with the lowest value (block 630). If the selected source's grant counter has not hit a saturation value (conditional block 625, "no" leg), then method 600 returns to block 615. After block 630, if the value of the lowest grant counter is greater than zero (conditional block 635, "yes" leg), then the value of the lowest grant counter is subtracted from every grant counter in the arbiter (block 640). Otherwise, if the value of the lowest grant counter is equal to zero (conditional block 635, "no" leg), then the grant counter that hit saturation is reduced by a programmable amount (block 645). In block 645, only the grant counter for the saturating source is reduced because at this point, history will be lost as the grant counter is at the limit of what it is capable of storing. If counters were reduced for all sources, quickly many sources would be pulled to a grant counter value of zero if only one source is continuously streaming packets. If counters were reduced for all sources, history would be lost across all sources. Instead, the arbiter can choose to lose history only for the source that is constantly saturating, which is more acceptable because this source is already getting picked at a high frequency by the arbiter. After blocks 640 and 645, method 600 returns to 615.

Figure 7:
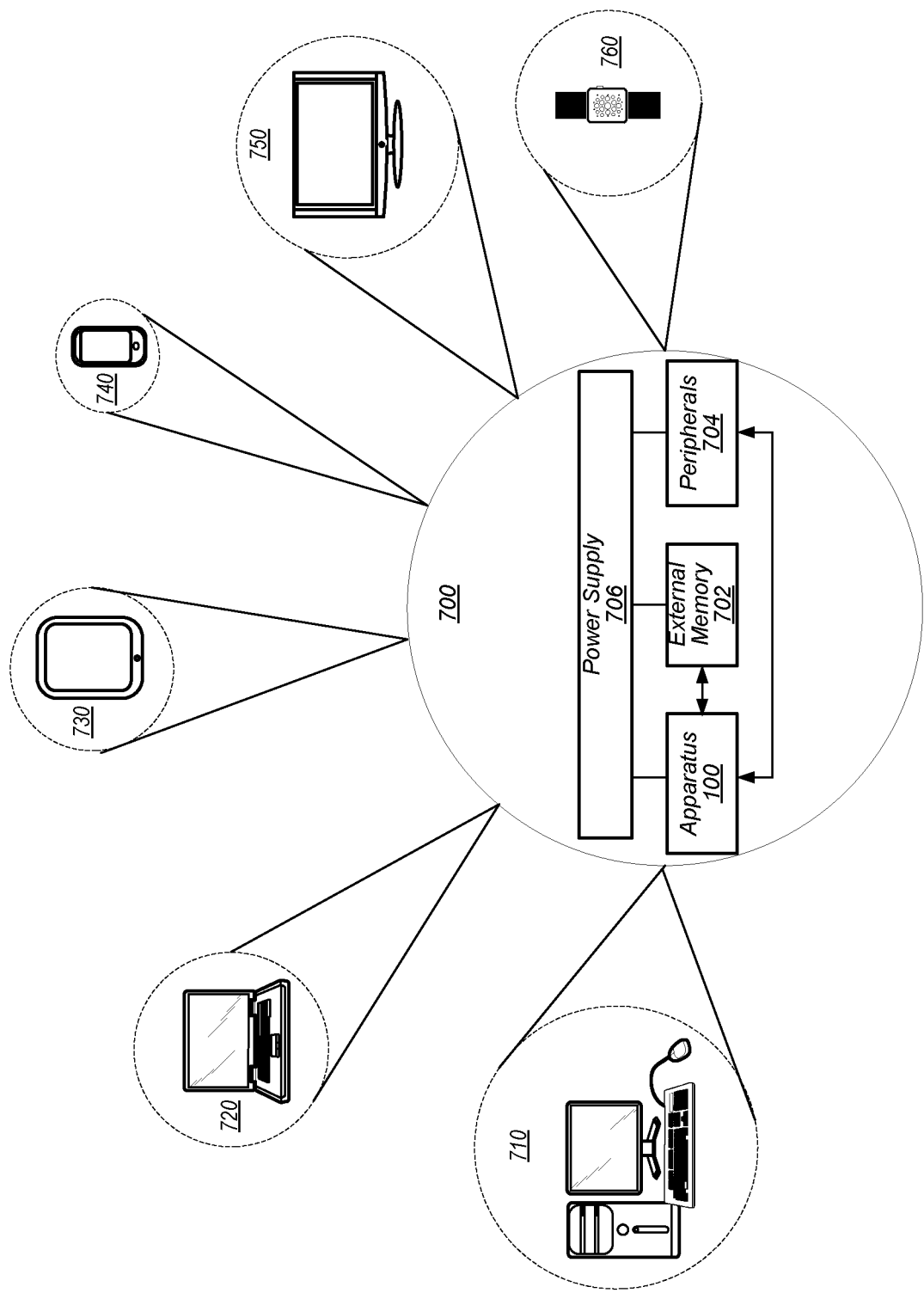
FIG. 7 is a block diagram of one embodiment of a system.

Referring now to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box configured to be coupled to a television), wrist watch or other wearable item 760, or otherwise. Other devices are possible and are contemplated. In the illustrated embodiment, the system 700 includes at least one instance of apparatus 100 (of FIG. 1) coupled to an external memory 702. In various embodiments, apparatus 100 may be a system on chip (SoC) or integrated circuit (IC) which is coupled to external memory 702, peripherals 704, and power supply 706.

Apparatus 100 is coupled to one or more peripherals 704 and the external memory 702. A power supply 706 is also provided which supplies the supply voltages to apparatus 100 as well as one or more supply voltages to the memory 702 and/or the peripherals 704. In various embodiments, power supply 706 may represent a battery (e.g., a rechargeable battery in a smart phone, laptop or tablet computer). In some embodiments, more than one instance of apparatus 100 may be included (and more than one external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with apparatus 100 in a chip-on-chip configuration, a package-on-package configuration, or a multi-chip module configuration.

The peripherals 704 may include any desired circuitry, depending on the type of system 700. For example, in one embodiment, peripherals 704 may include devices for various types of wireless communication, such as wife, Bluetooth, cellular, global positioning system, etc. The peripherals 704 may also include additional storage, including RAM storage, solid state storage, or disk storage. The peripherals 704 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. An arbiter comprising:
a plurality of counters; and
control logic configured to:
assign a minimum progress guarantee number of arbitration wins to two or more sources of a plurality of sources;

prioritize selecting sources which have not reached their minimum progress guarantee number when packets from multiple sources are concurrently eligible for arbitration; and based at least upon a determination that the two or more sources have received a number of arbitration wins at least equal to their corresponding assigned minimum progress guarantee number of arbitration wins for a current interval, determine, for a remainder of the current interval, which source wins arbitration in a given cycle based on which source has a lowest grant counter, wherein each grant counter tracks how often a corresponding source has won arbitration.

2. The arbiter as recited in claim 1, wherein the control logic is further configured to increment a given grant counter by a given grant increment based at least upon a determination that a given source winning a single round of arbitration, wherein the given grant increment is an inverse of a weight assigned to the given source.

3. The arbiter as recited in claim 1, wherein the plurality of counters comprises a grant counter and a win tracking counter assigned to one or more sources of packets, and wherein the control logic is further configured to reset one or more win tracking counters based at least upon a determination that an end of the current interval has occurred.

4. The arbiter as recited in claim 3, wherein the control logic is further configured to:
compare a given win tracking counter for the current interval for a given source to a given minimum progress guarantee number for the given source based at least upon a determination that a packet is received from the given source; and
based at least upon a determination that the given win tracking counter is less than the given minimum progress guarantee number:
select the packet as a winner of arbitration; and
increment the given win tracking counter.

5. The arbiter as recited in claim 1, wherein the control logic is further configured to initialize one or more grant counters of one or more sources to a corresponding grant increment at a start of the current interval, wherein one or more grant increments are an inverse of a corresponding grant weight.

6. The arbiter as recited in claim 1, wherein based at least upon a determination that a given grant counter reaches saturation, the control logic is configured to:
determine which grant counter has a lowest value among a plurality of grant counters corresponding to the plurality of sources; and
reduce one or more of the plurality of grant counters by an amount equal to the lowest value.

7. The arbiter as recited in claim 6, wherein based at least upon a determination that the lowest value among the plurality of grant counters is zero, the control logic is configured to:
reduce only the given grant counter by a programmable value; and
leave unchanged other grant counters of the plurality of grant counters which did not reach saturation.

8. A system comprising:
a plurality of functional units;
an arbiter coupled to the plurality of functional units, wherein the arbiter is configured to:
assign a minimum progress guarantee number of arbitration wins to two or more sources of a plurality of sources;

prioritize selecting functional units which have not reached their minimum progress guarantee number when packets from multiple functional units are concurrently eligible for arbitration; and based at least upon a determination that the two or more sources have received a number of arbitration wins at least equal to their corresponding assigned minimum progress guarantee number of arbitration wins for a current interval, determine, for a remainder of the current interval, which functional unit wins arbitration in a given cycle based on which functional unit has a lowest grant counter, wherein each grant counter tracks how often a corresponding functional unit has won arbitration.

9. The system as recited in claim 8, wherein the arbiter is further configured to increment a given grant counter by a given grant increment based at least upon a determination that a given functional unit winning a single round of arbitration, wherein the given grant increment is an inverse of a weight assigned to the given functional unit.

10. The system as recited in claim 8, wherein the plurality of counters comprises a grant counter and a win tracking counter assigned to one or more functional units, and wherein the arbiter is further configured to reset one or more win tracking counters based at least upon a determination that an end of the current interval has occurred.

11. The system as recited in claim 10, wherein the arbiter is further configured to:
compare a given win tracking counter for the current interval for a given functional unit to a minimum guarantee tunable value for the given functional unit based at least upon a determination that a packet is received from the given functional unit; and
responsive to determining that the given win tracking counter is less than the minimum guarantee tunable value:
select the packet as a winner of arbitration; and
increment the given win tracking counter.

12. The system as recited in claim 8, wherein the arbiter is further configured to initialize one or more grant counters of one or more functional units to a corresponding grant increment at a start of the current interval, wherein one or more grant increments are an inverse of a corresponding grant weight.

13. The system as recited in claim 8, wherein based at least upon a determination that a given grant counter reaches saturation, the arbiter is configured to:
determine which grant counter has a lowest value among a plurality of grant counters corresponding to the plurality of functional units; and
reduce one or more of the plurality of grant counters by an amount equal to the lowest value.

14. The system as recited in claim 13, wherein based at least upon a determination that the lowest value among the plurality of grant counters is zero, the arbiter is configured to:
reduce only the given grant counter by a programmable value; and
leave unchanged other grant counters of the plurality of grant counters which did not reach saturation.

15. A method comprising:
assigning, by an arbiter, a minimum progress guarantee number of arbitration wins to two or more sources of a plurality of sources;

prioritizing selecting sources which have not reached their minimum progress guarantee number when packets from multiple sources are concurrently eligible for arbitration; and in response to determining the two or more sources have received a number of arbitration wins at least equal to their corresponding assigned minimum progress guarantee number of arbitration wins for a current interval, determining, for a remainder of the current interval, which source wins arbitration in a given cycle based on which source has a lowest grant counter, wherein each grant counter tracks how often a corresponding source has won arbitration.

16. The method as recited in claim 15, further comprising incrementing a given grant counter by a given grant increment responsive to determining a given source wins a single round of arbitration, wherein the given grant increment is an inverse of a weight assigned to the given source.

17. The method as recited in claim 15, wherein the plurality of counters comprise a grant counter and a win tracking counter assigned to one or more sources of the arbiter, and wherein the method further comprising resetting one or more win tracking counters responsive to detecting an end of the current interval has occurred.

18. The method as recited in claim 17, further comprising:
comparing a given win tracking counter for the current interval for a given source to a minimum guarantee tunable value for the given source responsive to receiving a packet from the given source; and responsive to determining that the given win tracking counter is less than the minimum guarantee tunable value:
  selecting the packet as a winner of arbitration; and
  incrementing the given win tracking counter.

19. The method as recited in claim 15, further comprising initializing two or more grant counters of one or more sources to a corresponding grant increment at a start of the current interval, wherein one or more grant increments are an inverse of a corresponding grant weight.

20. The method as recited in claim 15, wherein responsive to a given grant counter reaching saturation, the method further comprising:
determining which grant counter has a lowest value among a plurality of grant counters corresponding to a plurality of sources; and reducing one or more of the plurality of grant counters by an amount equal to the lowest value.

* * * * *